(No Model.)

G. D. BURTON.
ELECTRIC METAL HEATER.

No. 475,264. Patented May 17, 1892.

WITNESSES.
E. F. Philipson
R. H. Gallup

INVENTOR.
G. D. Burton
By F. C. Somes
Attorney.

UNITED STATES PATENT OFFICE.

GEORGE D. BURTON, OF BOSTON, MASSACHUSETTS, ASSIGNOR TO THE ELECTRICAL FORGING COMPANY, OF MAINE.

ELECTRIC METAL-HEATER.

SPECIFICATION forming part of Letters Patent No. 475,264, dated May 17, 1892.

Application filed August 3, 1891. Serial No. 401,544. (No model.)

*To all whom it may concern:*

Be it known that I, GEORGE DEXTER BURTON, a citizen of the United States of America, residing at Boston, in the county of Suffolk, in the State of Massachusetts, have invented certain new and useful Improvements in Electric Heaters, of which the following is a specification.

This invention relates to electric heaters for cooking food or for heating metals preparatory to forging or tempering them.

The object of the invention is to provide means for the convenient utilization within a compact space by a number of workmen and without loss of efficiency of the induced electric current of large volume and low voltage obtained from an electric converter.

Figure 1:
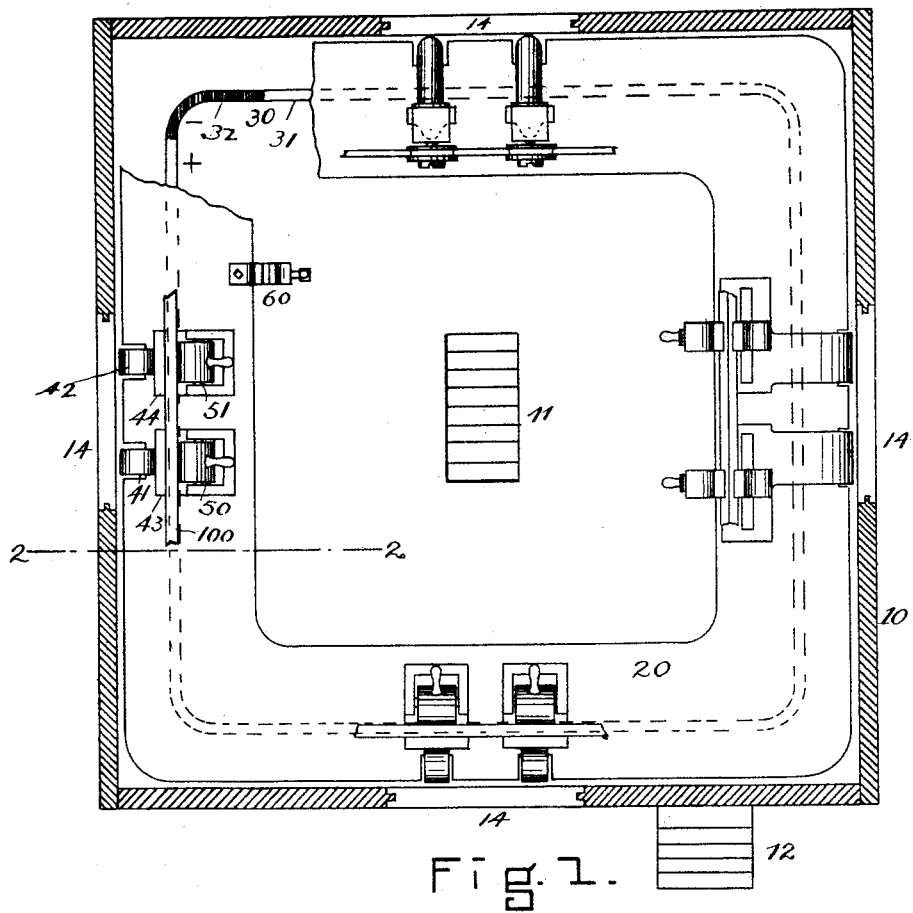
Figure 2:
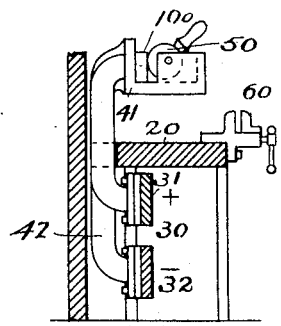

Figure 1 of the accompanying drawings represents a plan of a workshop or workroom provided with this improved electric heater. Fig. 2 represents a vertical section of a portion thereof on line 2 2 of Fig. 1.

Similar numerals of reference indicate corresponding parts in both figures.

The workshop 10 for containing this improved electric heater may be disposed in the basement of a building or on a floor above ground. If disposed in the basement or on one of the upper floors, a stairway 11 will extend from the ground-floor or the floor below into the central portion of the room. If on the ground floor, an elevated door, reached by a short flight of steps 12, will serve as an entrance, and a short flight of steps will reach from the floor of the shop to the plane of the elevated door.

The shop is provided with windows 14 or other means of illumination. As shown in the drawings, the shop is rectangular; but it may be constructed in any other desirable form. A continuous work bench or table 20 is disposed within and extends around the shop adjacent to the walls thereof, being provided in its outer edge with recesses or notches 21, disposed in pairs at intervals. An electric converter 30, which receives an electric current of small volume and high voltage from an alternating dynamo or other source and converts it into a current of low voltage and large volume, is disposed within and extends around the shop beneath the bench 20. The details of construction of this converter do not constitute a part of this invention and need not necessarily be herein specifically set forth.

The converter which has been used in this apparatus consists of an annular core composed of different lengths of uninsulated or partially-insulated wire, said lengths being arranged side by side and breaking joints at various intervals in the core, primary circuit-coils composed of comparatively fine wire and surrounding the said core at intervals, secondary coils composed of sheets or flakes of copper surrounding said core between the primary coils and insulated therefrom, two exterior copper rings disposed around the structure, the positive terminals of all the secondary coils being connected to one of said rings and the negative terminals of said secondary coils being all connected to the other of said rings, said rings thus constituting the positive and negative terminals of the converter, as hereinafter described. The primary coils are arranged in pairs, the coils of each pair being in series with each other and in parallel with every pair. The secondary coils are connected to the rings in the parallel or multiple arc. The exterior rings of the converter above referred to are shown in the drawings, the ring 31 constituting the positive pole of the converter and the ring 32 constituting the negative pole thereof. These rings serve to distribute around the shop the secondary currents of large volume and low voltage induced in the converter.

A number of electric heaters proper or forges are connected with the converter-rings at suitable intervals for the convenient working thereof. Each of these forges or heaters comprises an upturned bracket 41, connected with the positive ring 31, and a longer upturned bracket 42, connected with the negative converter-ring 32. The upper ends of these brackets are turned inward over the bench 20 in the same horizontal plane and provided with arms 43 and 44. Clamps or work-holders 50 and 51 are disposed on said arms for holding the metal bars or blanks 100 to be heated. The specific construction of these work-holders need not be herein set forth, as they constitute the subjects of other applications.

Vises, anvils, or other metal-working devices 60 are disposed on the bench 20 adjacent to the several forges or heaters proper.

In the use of this improved electric heater workmen are disposed opposite the several forges and utilize the current obtained from the converter in a convenient and economical manner.

I claim as my invention—

1. In an electric heater, the combination of a work-bench, an endless electric converter disposed beneath said bench and having positive and negative rings for distributing the electric current, and a number of heaters proper connected with said rings and disposed over said bench.

2. In an electric heater, the combination of a current-converter having positive and negative rings, upwardly-extending brackets connected with said rings, and a work-holder connected with said brackets.

3. In an electric heater, the combination of an annular work-bench, an endless electric converter disposed adjacent to said work-bench, and means for utilizing the current induced in said converter, disposed at intervals over said bench and connected with said converter.

In testimony that I claim the invention above set forth I affix my signature in presence of two witnesses.

GEO. D. BURTON.

Witnesses:
CHESTER MARR,
E. F. PHILIPSON.